United States Patent
Se et al.

(10) Patent No.: US 10,288,313 B2
(45) Date of Patent: May 14, 2019

(54) GAS SUPPLY MANIFOLD AND PRODUCTION METHOD OF GAS SUPPLY MANIFOLD

(71) Applicant: NORITZ CORPORATION, Hyogo (JP)

(72) Inventors: Naoki Se, Kobe (JP); Michihisa Nakahara, Kobe (JP); Hideyuki Fujisawa, Kobe (JP); Kenichi Sakurai, Kobe (JP); Yuta Tsuji, Kobe (JP); Keizo Kawano, Kobe (JP); Taihei Terasawa, Kobe (JP); Masahiro Kawamoto, Kobe (JP); Masaharu Imaizumi, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 125 days.

(21) Appl. No.: 15/380,273

(22) Filed: Dec. 15, 2016

(65) Prior Publication Data

US 2017/0184324 A1 Jun. 29, 2017

(30) Foreign Application Priority Data

Dec. 25, 2015 (JP) ................................. 2015-253801
Dec. 25, 2015 (JP) ................................. 2015-253810

(51) Int. Cl.
*F24H 8/00* (2006.01)
*F24H 1/20* (2006.01)
*B23P 15/26* (2006.01)

(52) U.S. Cl.
CPC .............. *F24H 1/206* (2013.01); *B23P 15/26* (2013.01)

(58) Field of Classification Search
CPC ................................. F24H 1/206; B23P 15/26
See application file for complete search history.

(56) References Cited

U.S. PATENT DOCUMENTS 2,321,755 A * 6/1943 Kost ....................... F16B 5/045
                                                                                     29/512
8,204,414 B2 * 6/2012 Kondo ............... G03G 15/0812
                                                                                    399/274

(Continued)

FOREIGN PATENT DOCUMENTS

JP       09060617 A * 3/1997
JP     2003-065507 A    3/2003

(Continued)

*Primary Examiner* — Nathaniel Herzfeld
(74) *Attorney, Agent, or Firm* — Studebaker & Brackett PC

(57) ABSTRACT

A gas supply manifold has a nozzle forming member having a plurality of gas injection nozzles, a cover member configured to be overlapped on the nozzle forming member, and a caulking-fastening portion configured to fasten the nozzle forming member and the cover member. The caulking-fastening portion is configured such that a convex portion provided for one of the nozzle forming member and the cover member penetrates a hole provided for the other member, and a tip end portion of the convex portion has an engagement portion, the engagement portion having a larger diameter or a larger width than the hole and being engaged with a peripheral edge portion of the hole. A tip end face of the convex portion has a dent portion formed by pressing the tip end face into a base portion side of the convex portion and an area around the dent portion constitutes the engagement portion. Thus, the nozzle forming member and the cover member are appropriately caulked and fastened.

4 Claims, 6 Drawing Sheets

(56) References Cited

U.S. PATENT DOCUMENTS

| | | | | |
|---|---|---|---|---|
| 2007/0286673 A1* | 12/2007 | Ishino | ................... | B21D 39/03 |
| | | | | 403/311 |
| 2008/0069597 A1* | 3/2008 | Ishida | ............... | G03G 15/0812 |
| | | | | 399/265 |
| 2014/0060136 A1* | 3/2014 | Fujimoto | ............... | B21D 53/24 |
| | | | | 72/46 |
| 2017/0370574 A1* | 12/2017 | Tsuji | ....................... | F23D 14/02 |

FOREIGN PATENT DOCUMENTS

| JP | 2004276037 A | * 10/2004 |
|---|---|---|
| JP | 4104005 B2 | 6/2008 |

* cited by examiner

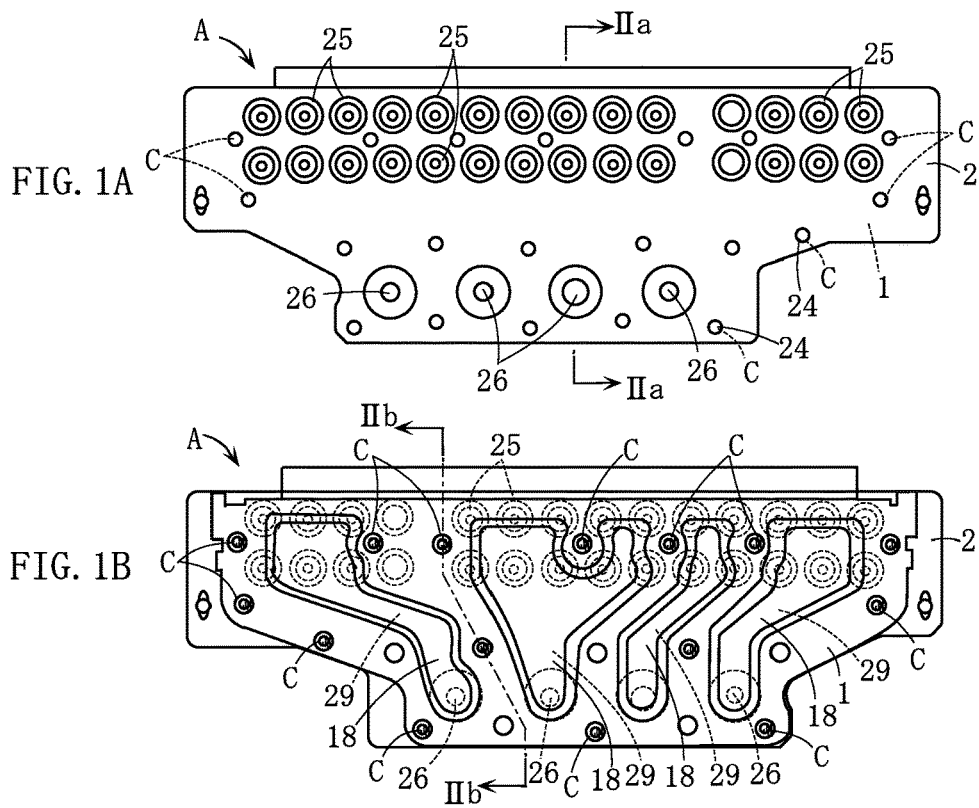
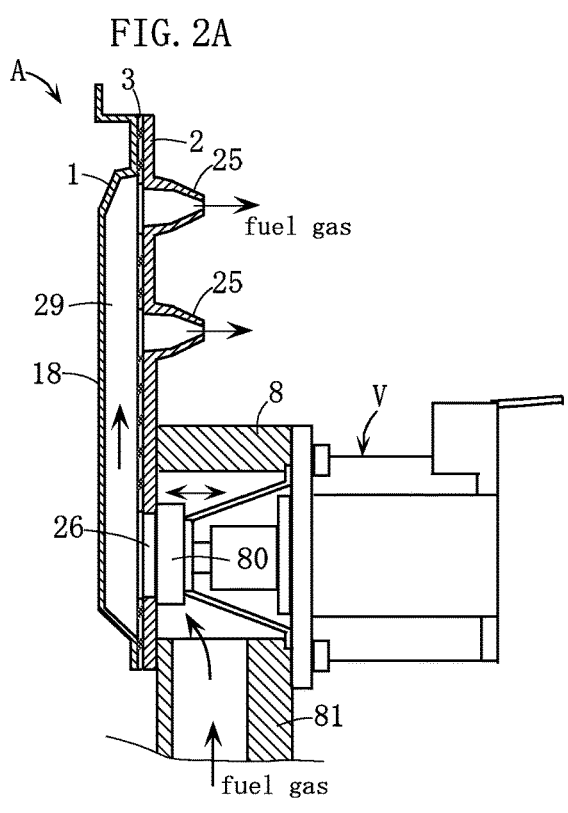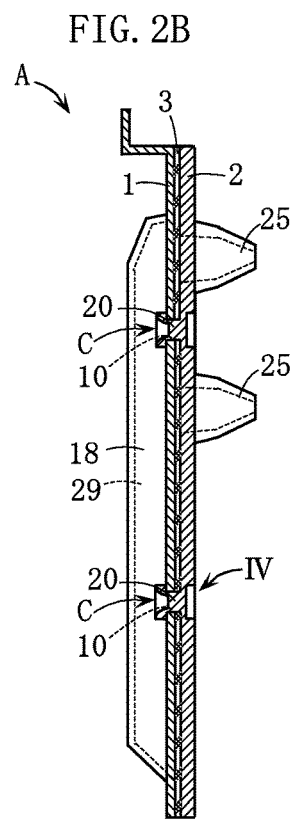

GAS SUPPLY MANIFOLD AND PRODUCTION METHOD OF GAS SUPPLY MANIFOLD

BACKGROUND OF THE INVENTION

Field of the Invention

The present invention relates to a gas supply manifold to be used as a constitutional element of a gas combustion device for a water heating apparatus and a production method of the gas supply manifold.

Description of the Related Art

A gas combustion apparatus of a water heating apparatus is generally configured to supply fuel gas from a gas supply manifold into a plurality of burner heads, i.e. combustion pipes. A gas supply manifold is disclosed in, for example, Patent Literatures 1 and 2.

A gas supply manifold disclosed in Patent Literatures has a nozzle forming member having a plurality of gas injection nozzles and has a cover member, the cover member being overlapped on the nozzle forming member, thereby constituting a gas supply path between the cover member and the nozzle forming member, both members being caulked and fastened. In such a caulking-fastening structure, a convex portion provided for one of the nozzle forming member and the cover member is inserted into a hole provided for the other member. In addition, a tip end portion of the convex portion is pressed so as to have a larger diameter than the hole. Thereby, the tip end portion of the convex portion is formed with an engagement portion which is engaged with a peripheral edge portion of the hole.

In such a structure, screw members are not required or such necessity is reduced unlike the case in which the nozzle forming member and the cover member are fastened with screws. Therefore, a gas supply manifold is produced at a low cost.

However, there is still a room for improvement in the related art as mentioned below.

In the caulking-fastening structure in the above related art, the tip end portion of the convex portion is only compressed and deformed to enlarge the outer diameter so as to form the engagement portion. Therefore, when the amount of compression and deformation of the convex portion is increased in order to enlarge the outer diameter of the engagement portion, the entire thickness of the engagement portion becomes thin, thereby reducing the strength of the engagement portion and strength of caulking-fastening. On the other hand, when the amount of compression and deformation of the convex portion reduces in order to increase the thickness of the engagement portion, the outer diameter of the engagement portion becomes small, thereby reducing the engagement area of the engagement portion and the peripheral edge portion of the hole and reducing the strength of caulking-fastening. Accordingly, in the related art, it has been difficult to caulk and fasten the nozzle forming member and the cover member in an appropriate condition, so that there is a room for improving the productivity.

On the other hand, the nozzle forming member and the cover member are constituted with relatively thin plate members. The gas supply manifold is generally provided with a plurality of valves to control an on-off and a flow rate of gas supply. In view of facilitating attachment of a plurality of valves and provision of the gas supply path communicating with the valves, one of the nozzle forming member and the cover member can be a die-cast product with a relatively large thickness. If such a measure is applied, the plate member is sometimes required to be fastened to an area of a base member with a large thickness.

However, in the caulking-fastening structure of the above mentioned related art, in order to appropriately form the engagement portion, the tip end portion of the convex portion is required to project out of the hole when the convex portion is inserted through the hole. When one of the nozzle forming member and the cover member is a die-cast product and has a large thickness and the hole is deep, it is difficult to appropriately fasten both members by the above-mentioned caulking-fastening structure. As a result, screws are inevitably used for fastening the nozzle forming member and the cover member. In such a case, the members for screwing require further cost and a screwing operation is complicated, thereby deteriorating the productivity and increasing the production cost of the gas supply manifold.

CITATION LIST

Patent Literature 1: Japanese Unexamined Patent Application Publication No. 2003-065507
Patent Literature 2: Japanese Patent No. 4104005

SUMMARY OF THE INVENTION

An object of the present invention is to provide a gas supply manifold and the production method thereof in order to solve or suppress the above-mentioned problems.

In order to solve the above-mentioned problems, the present invention proposes the following technical means.

A gas supply manifold proposed in the first aspect of the present invention has a nozzle forming member having a plurality of gas injection nozzles, a cover member configured to be overlapped on the nozzle forming member and to form a gas supply path communicating with the gas injection nozzles between the cover member and the nozzle forming member, and at least one caulking-fastening portion configured to fasten the nozzle forming member and the cover member. The caulking-fastening portion is configured in such a manner that a convex portion provided for one of the nozzle forming member and the cover member penetrates through a hole provided for the other member, and a tip end portion of the convex portion projects out of the hole and is formed with an engagement portion, the engagement portion having a larger diameter or a larger width than the hole and engaging with a peripheral edge portion of the hole. A tip end face of the convex portion has a dent portion formed by pressing the tip end face toward a base portion side of the convex portion and an area around the dent portion of the convex portion constitutes the engagement portion.

Preferably, the dent portion has a bottom portion and an inclined inner circumferential face of which inner diameter increases toward a tip end side of the convex portion from the bottom portion.

Preferably, the inclined inner circumferential face is a convexly curved face of which inclination angle gradually becomes perpendicular to an axial direction of the convex portion toward the tip end side of the convex portion.

Preferably, an area, corresponding to the engagement portion, of the tip end face of the convex portion has a flat face portion having an angle substantially perpendicular to the axial direction of the convex portion.

Preferably, one member, having the hole, of the nozzle forming member and the cover member is formed in such a manner that an area around the hole is partially thinner than the other area.

Preferably, the convex portion has a two-stepped convex structure configured in such a manner that a second convex portion is provided at a tip end side of a first convex portion, an outer diameter or a width of the second convex portion being smaller than that of the first convex portion. One member, having the hole, of the nozzle forming member and the cover member abuts a tip end face of the first convex portion, the second convex portion is inserted into the hole, and the engagement portion is formed utilizing the second convex portion. A sealing packing is provided between the nozzle forming member and the cover member, the sealing packing having a through hole through which the first convex portion penetrates.

A gas supply manifold proposed in the second aspect of the present invention has a nozzle forming member having a plurality of gas injection nozzles, a cover member configured to be overlapped on the nozzle forming member and to form a gas supply path communicating with the gas injection nozzles between the cover member and the nozzle forming member, and at least one caulking-fastening portion configured to fasten the nozzle forming member and the cover member. The caulking-fastening portion is configured such that a through hole is provided for one of the nozzle forming member and the cover member, a convex portion to be inserted into the through hole is provided for the other member, a part of an inner circumferential face of the through hole is an inclined inner circumferential face of which inner diameter becomes small toward the other member, and the convex portion has an engagement portion configured to be engaged with the inclined inner circumferential face.

Preferably, a tip end face of the convex portion has a dent portion formed by pressing the tip end face into a base portion side of the convex portion and an area around the dent portion of the convex portion constitutes the engagement portion, and an outer circumferential face of the engagement portion is an inclined outer circumferential face which faces and contacts the inclined inner circumferential face.

Preferably, one of the nozzle forming member and the cover member is a press-molded product made of metal and the other member is a die-cast product.

Preferably, thicknesses of the nozzle forming member and the cover member are different, the through hole is provided for the member having a larger thickness, and the convex portion is provided for the other member.

A production method of a gas supply manifold proposed in the third aspect of the present invention includes an assembling step of a nozzle forming member and a cover member of the gas supply manifold in which a convex portion provided for one of the nozzle forming member and the cover member is inserted into a hole provided for the other member so as to project the convex portion through the hole, the nozzle forming member having a plurality of gas injection nozzles, the cover member being overlapped on the nozzle forming member and forming a gas supply path communicating with the gas injection nozzles between the cover member and the nozzle forming member; and includes a caulking-fastening step in which a tip end portion of the convex portion is configured to have a larger diameter or a larger width than the hole and to be engaged with a peripheral edge portion of the hole, after the assembling step. A tip end face of the convex portion has a dent portion formed by pressing the tip end face of the convex portion toward a base portion side of the convex portion by a punch.

Preferably, a tip end portion of the punch has a projecting portion in a shape of a substantially conical trapezoid of which outer diameter becomes small toward a tip end side and of which an outer circumferential face is a concavely curved face, and the projecting portion is inserted into the tip end portion of the convex portion in the caulking-fastening step.

Preferably, a tip end portion of the punch has a projecting portion in a shape of a substantial cross seen in an axial direction of the punch and the projecting portion becomes small toward a tip end side, and the projecting portion is inserted into the tip end portion of the convex portion in the caulking-fastening step.

In a production method of a gas supply manifold proposed in the fourth aspect of the present invention, a through hole is provided for one of a nozzle forming member and a cover member of the gas supply manifold, a convex portion is provided for the other member, the nozzle forming member having a plurality of gas injection nozzles, and the cover member is overlapped on the nozzle forming member and forms a gas supply path communicating with the gas injection nozzles between the cover member and the nozzle forming member, an inner circumferential face close to an one end opening portion of the through hole being an inclined inner circumferential face of which inner diameter becomes small toward the one end opening portion. The production method includes an assembling step of the nozzle forming member and the cover member by inserting the convex portion into the through hole, and a caulking-fastening step in which the convex portion is deformed so as to engage with the inclined inner circumferential portion of the through hole by pressing a tip end portion of the convex portion by a punch inserted into the through hole, after the assembling step.

Preferably, in the caulking-fastening step, a tip end face of the convex portion is pressed by the punch so as to form a dent portion on the tip end face, and an outer circumferential face around the dent portion of the convex portion is formed with an inclined outer circumferential face which faces and contacts the inclined inner circumferential face.

The other characteristics and advantages of the present invention are apparent from the following explanation of the preferred embodiments referring to the attached drawings.

BRIEF DESCRIPTION OF THE DRAWINGS

FIG. 1A is a front view showing one embodiment of a gas supply manifold of the present invention, and FIG. 1B shows its back view.

FIG. 2A is a sectional view taken along the line IIa to IIa in FIG. 1A, and FIG. 2B is a sectional view taken along the line IIb to IIb in FIG. 1B.

DETAILED DESCRIPTION OF THE PREFERRED EMBODIMENT

Figure 3:
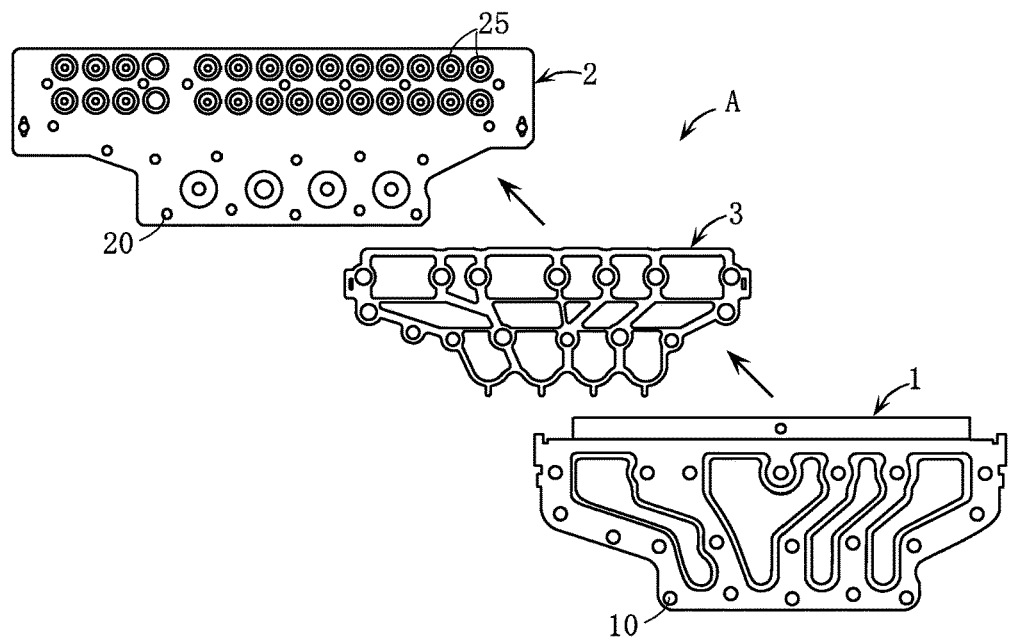
FIG. 3 is an exploded back view of the gas supply manifold shown in FIG. 1B.

Preferred embodiments of the present invention are explained below with reference to the accompanying drawings.

A gas supply manifold A shown in FIG. 1A to FIG. 3 is one of the members constituting a gas combustion apparatus of a water heating apparatus and supplies fuel gas into a plurality of burner heads, i.e. combustion pipes, provided for the gas combustion device. The gas supply manifold A is constituted in such a manner that a nozzle forming member 2 and a cover member 1, both being metal plates, are combined.

The nozzle forming member 2 is integrally formed with a plurality of gas injection nozzles 25 by a press molding and is namely a nozzle plate. The cover member 1 is overlapped on a back of the nozzle forming member 2 via a sealing packing 3. A plurality of gas supply paths 29 communicating with the gas injection nozzles 25 are formed between the cover member 1 and the nozzle forming member 2. In order to form the gas supply paths 29, the cover member 1 has a plurality of bulging portions 18 which bulge in a direction apart from the nozzle forming member 2 and are in the form of stripes seen from the back. The inside of the bulging portion 18 constitutes the gas supply path 29.

A plurality of opening portions 26 are formed in an area close to a lower portion of the nozzle forming member 2 in order to flow fuel gas into the gas supply paths 29, respectively. As shown in FIG. 2A, the gas supply manifold A attached to an auxiliary member 8 for supplying fuel gas is used. Fuel gas supplied from a gas pipe, not shown, passes through a gas supply path 81 in the auxiliary member 8 and the opening portion 26, and then flows into the gas supply path 29 of the gas supply manifold A. The auxiliary member 8 is provided with an on-off valve V having a valve body 80 for opening or closing the opening portion 26. The auxiliary member 8 is also provided with a flow control valve, a main solenoid valves and so on, not shown in the figures.

Figure 4:
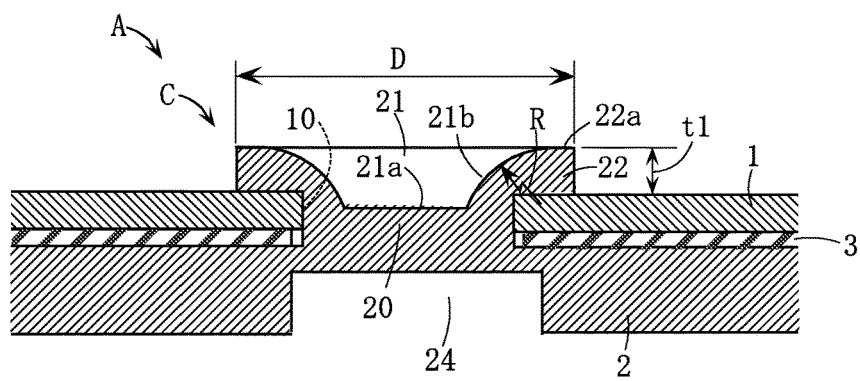
FIG. 4 is an enlarged sectional view of a part IV in FIG. 2B and shows one embodiment of a caulking structure.

The nozzle forming member 2 and the cover member 1 are fastened by a caulking-fastening portion C shown in FIG. 4. In the figure, a hole 10 is provided so as to penetrate the cover member 1. The nozzle forming member 2 has a convex portion 20 so as to penetrate through the hole 10. A projecting portion, projecting out of the hole 10, of the convex portion 20 has a larger diameter than the hole 10, and an area of the projecting portion close to an outer peripheral edge constitutes an engagement portion 22 which abuts and engages with a peripheral edge portion of the hole 10. The convex portion 20 has a dent portion 21 formed by pressing a substantially central portion of a tip end side of the convex portion 20 into a base portion side of the convex portion 20, and an area around the dent portion 21 constitutes the engagement portion 22.

The dent portion 21 has a bottom portion 21a having a predetermined dimension and has an inclined inner circumferential face 21b of which inner diameter increases toward the tip end side of the convex portion 20 from the bottom portion 21a. The inclined inner circumferential face 21b is preferably a convexly curved face with an appropriate radius of curvature R and the inclined angle becomes close to an angle perpendicular to the axial direction of the convex portion 20, i.e. a horizontal angle in FIG. 4. At least a peripheral edge area of the engagement portion 22 forms a flat face portion 22a connected with the convexly curved inner circumferential face 21b. The flat face portion 22a has an angle substantially perpendicular to the axial direction of the convex portion 20.

Figure 5A:
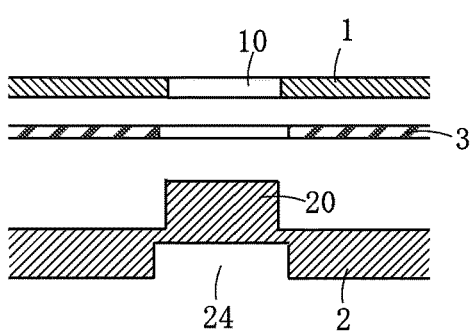
FIG. 5A and FIG. 5B show sectional views of an essential part of one embodiment of a production process of the caulking structure shown in FIG. 4.
Figure 5B:
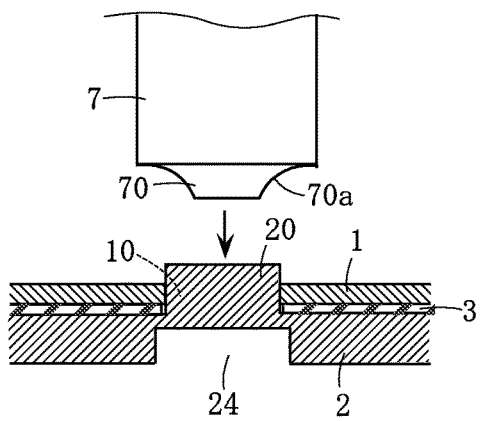

The above-mentioned caulking-fastening portion C is produced as shown in FIG. 5A and FIG. 5B.

As shown in FIG. 5A, the cover member 1 is formed with the hole 10 and the nozzle forming member 2 is formed with the convex portion 20. The convex portion 20 is formed by a spinning processing, i.e. an extrusion processing, in such a manner that a concave portion 24 is formed on an opposite face of the nozzle forming member 2. The width of the concave portion 24 is the same as or larger than that of the convex portion 20, thereby strengthening the engagement.

Then, as shown in FIG. 5B, the cover member 1 and the nozzle forming member 2 are overlapped so as to interpose the sealing packing 3 therebetween, the convex portion 20 goes through the hole 10, and a tip end portion of the convex portion 20 projects out of the hole 10. Thereafter, the projecting portion of the convex portion 20 is deformed by pressing with a punch 7. The concave portion 24 is supported by an appropriate member so as to keep the position in such a manner that the nozzle forming member 2 does not undesirably deflect downward. A projecting portion 70 is formed at the tip end portion of the punch 7 for forming the dent portion 21 shown in FIG. 4 and intensively presses a substantially central portion of the tip end face of the convex portion 20 into the base portion side of the convex portion 20. The projecting portion 70 is substantially in the shape of a conical trapezoid of which outer diameter becomes small toward a tip end side and of which an outer circumferential face 70a is a concavely curved face. Thus, the deformation amount of the convex portion 20 toward the outer radius direction of the hole 10 increases and the caulking-fastening portion C shown in FIG. 4 is appropriately formed.

As shown in FIG. 1A and FIG. 1B, a plurality of caulking-fastening portions C are dispersedly provided for the gas supply manifold A at appropriate intervals so as not to generate inappropriate gaps which cause gas leakage.

In the above-mentioned gas supply manifold A, the cover member 1 and the nozzle forming member 2 are appropriately caulked and fastened utilizing a plurality of caulking-fastening portions C. At a substantially central portion of the tip end side of the convex portion 20 constituting the caulking-fastening portion C, the volume of the engagement portion 22 around the dent portion 21 increases by the volume in which the dent portion 21 is formed, thereby increasing an outer diameter D in addition to a thickness t1 of the engagement portion 22. Therefore, the engagement portion 22 is strengthened and furthermore the engagement of the engagement portion 22 and the cover member 1 is secured and strengthened. Specifically, the dent portion 21 with the bottom portion 21a having a predetermined dimension has a large volumetric capacity, and the inner circumferential face 21b is inclined and also is the convexly curved face as mentioned above, thereby the dent portion 21 is preferable to increase the volume of the engagement portion 22. The flat face portion 22a of the engagement portion 22 enhances a pressurized contact force of the engagement portion 22 and the cover member 1.

As mentioned above, strength of caulking-fastening is enhanced. The pressing pressure when the convex portion 20 is pressed and deformed is easily set comparing to the related art, thereby facilitating the caulking-fastening operation, enhancing productivity of the gas supply manifold A, and reducing the production cost.

FIG. 6 to FIG. 14B show other embodiments of the present invention. In the figures, the same or the similar elements in the above mentioned embodiments are allotted with the same reference numerals and redundant explanations are omitted.

Figure 6:
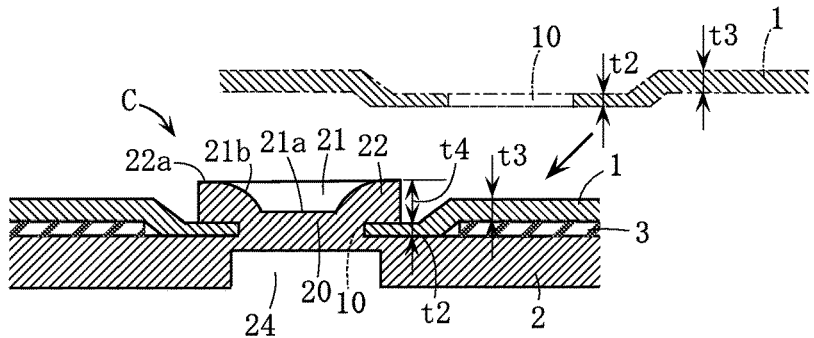
FIG. 6 is a sectional view of an essential part showing another embodiment of the caulking structure of the present invention.

In the embodiment shown in FIG. 6, the cover member 1 is formed in such a manner that a thickness t2 of the area around the hole 10 becomes small than a thickness t3 of the other area. Such a structure of the cover member 1 is done by a pressing process. In such a structure, a thickness t4 of the engagement portion 22 becomes large by the reduced amount of the thickness t2 around the hole 10, thereby improving the strength.

Figure 7A:
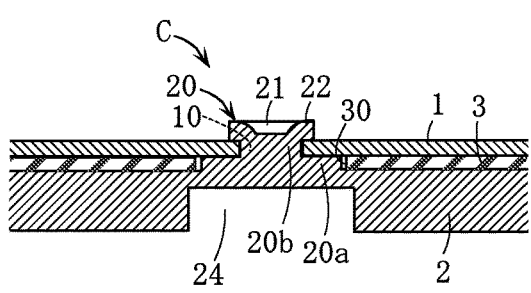
FIG. 7A is a sectional view of an essential part showing another embodiment of the caulking structure of the present invention.

In the embodiment shown in FIG. 7A, the convex portion 20 of the nozzle forming member 2 is a two-stepped convex structure having a first convex portion 20a and a second convex portion 20b. The second convex portion 20b is provided on a tip end side of the first convex portion 20a and has an outer diameter smaller than that of the first convex portion 20a. The cover member 1 abuts the first convex portion 20a and the second convex portion 20b is inserted through the hole 10. A part of the area on a tip end side of the second convex portion 20b constitutes the engagement portion 22. The sealing packing 3 is interposed between the nozzle forming member 2 and the cover member 1, the sealing packing 3 having a through hole 30 through which the first convex portion 20a penetrates.

The caulking-fastening portion C constituted as mentioned above is produced as shown in FIG. 7B. Specifically, the nozzle forming member 2 is positioned such that the convex portion 20 faces upward, the sealing packing 3 and the cover member 1 are sequentially provided on the nozzle forming member 2, and then the second convex portion 20b is compressed and deformed. The sealing packing 3 is able to be positioned utilizing fitting of the first convex portion 20a and the through hole 30. The first convex portion 20a is set at such a dimension that the sealing packing 3 is able to be compressed at the time of caulking.

Figure 7B:
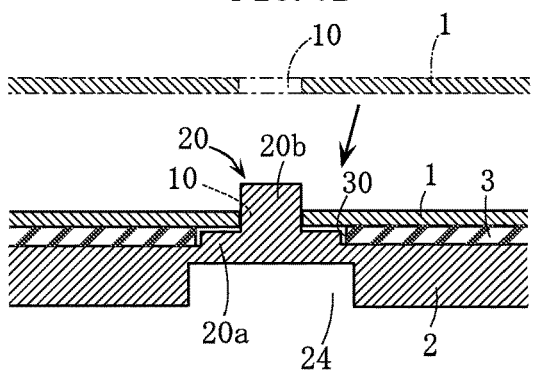
FIG. 7B is a sectional view of an essential part showing the structure before caulking.
Figure 8:
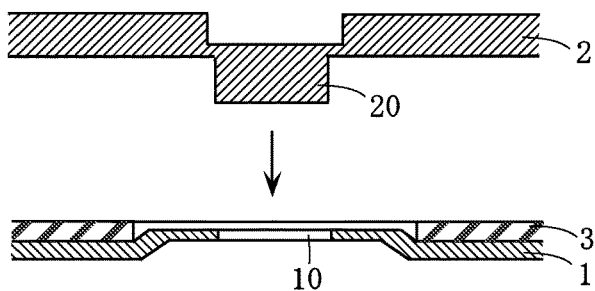
FIG. 8 is a sectional view of an essential part showing a comparison embodiment relative to FIG. 7A and FIG. 7B.

In the assembly shown in FIG. 7A and FIG. 7B, when the second convex portion 20b is inserted through the hole 10, whether such operation is appropriately done or not is visually confirmed from upward. In the comparison structure shown in FIG. 8, the cover member 1 has a convex portion and so on, not shown, for aligning with the sealing packing 3, so that the sealing packing 3 is provided on the cover member 1 and the nozzle forming member 2 is further provided thereon. In this case, the convex portion 20 faces downward and it is difficult to determine whether the convex portion 20 is appropriately inserted into the hole 10 or not. On the other hand, in the embodiment of the present invention shown in FIG. 7A and FIG. 7B, such a disadvantage is able to be eliminated. In addition, the cover member 1 is not required to be provided with the convex portion for aligning with the sealing packing 3.

Figure 9A:
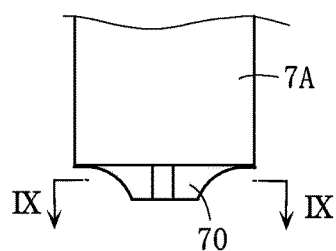
FIG. 9A is a side view showing an essential part of another embodiment of a punch.
Figure 9B:
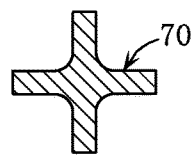
FIG. 9B is a sectional view taken along the line IX to IX in FIG. 9A.

In the embodiment of the present invention shown in FIG. 9A and FIG. 9B, a projecting portion 70 at a tip end of a punch 7A is substantially in the shape of a cross seen in the axial direction and becomes small toward the tip end side. With such a punch 7A, the dent portion 21 is formed substantially in the shape of the cross corresponding to the projecting portion 70. Such a structure is able to achieve the operation intended in the present invention. The dent portion explained in the present invention is not limited to be circular and can be non-circular seen on the plan view.

Figure 10:
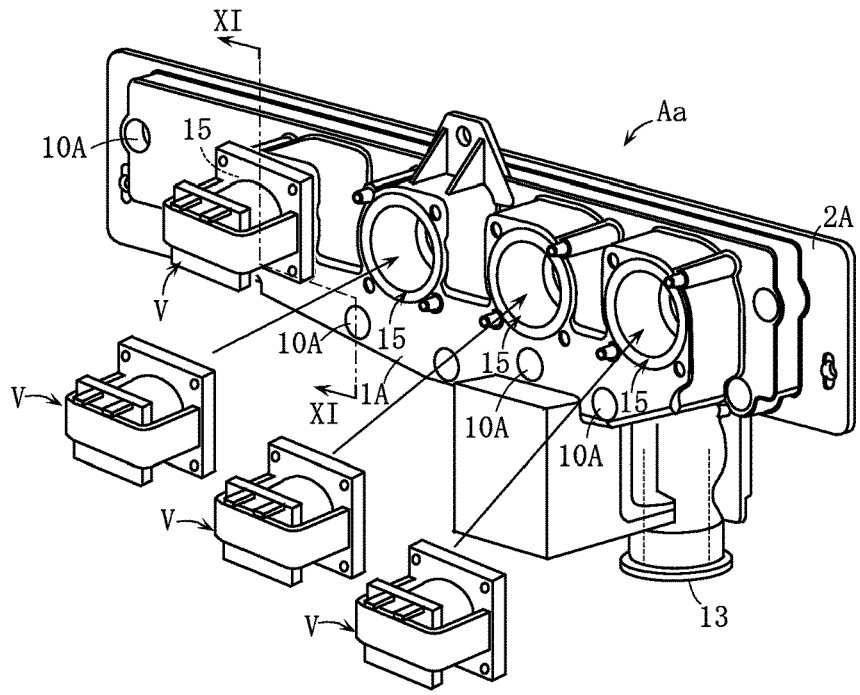
FIG. 10 is a perspective view of an essential part showing another embodiment of the gas supply manifold of the present invention.
Figure 11:
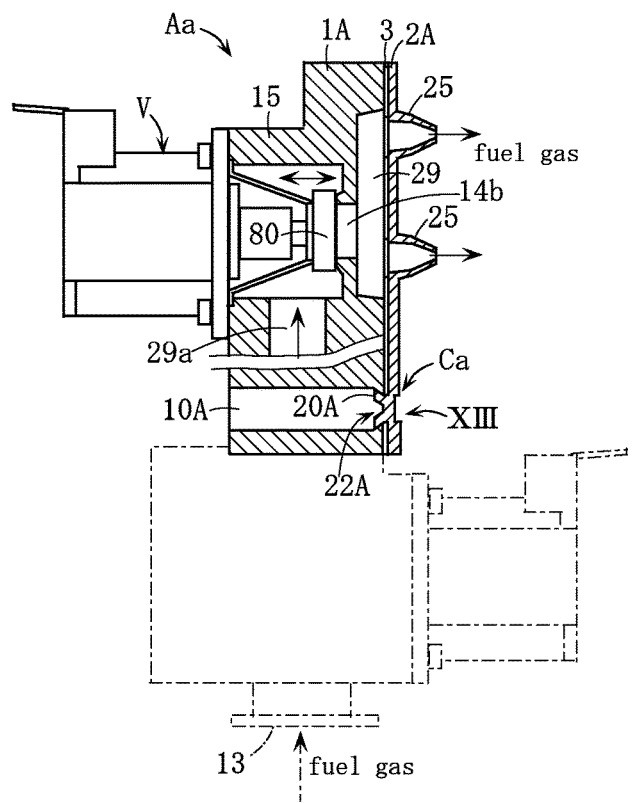
FIG. 11 is a diagrammatical sectional view taken along the line XI to XI in FIG. 10.
Figure 12:
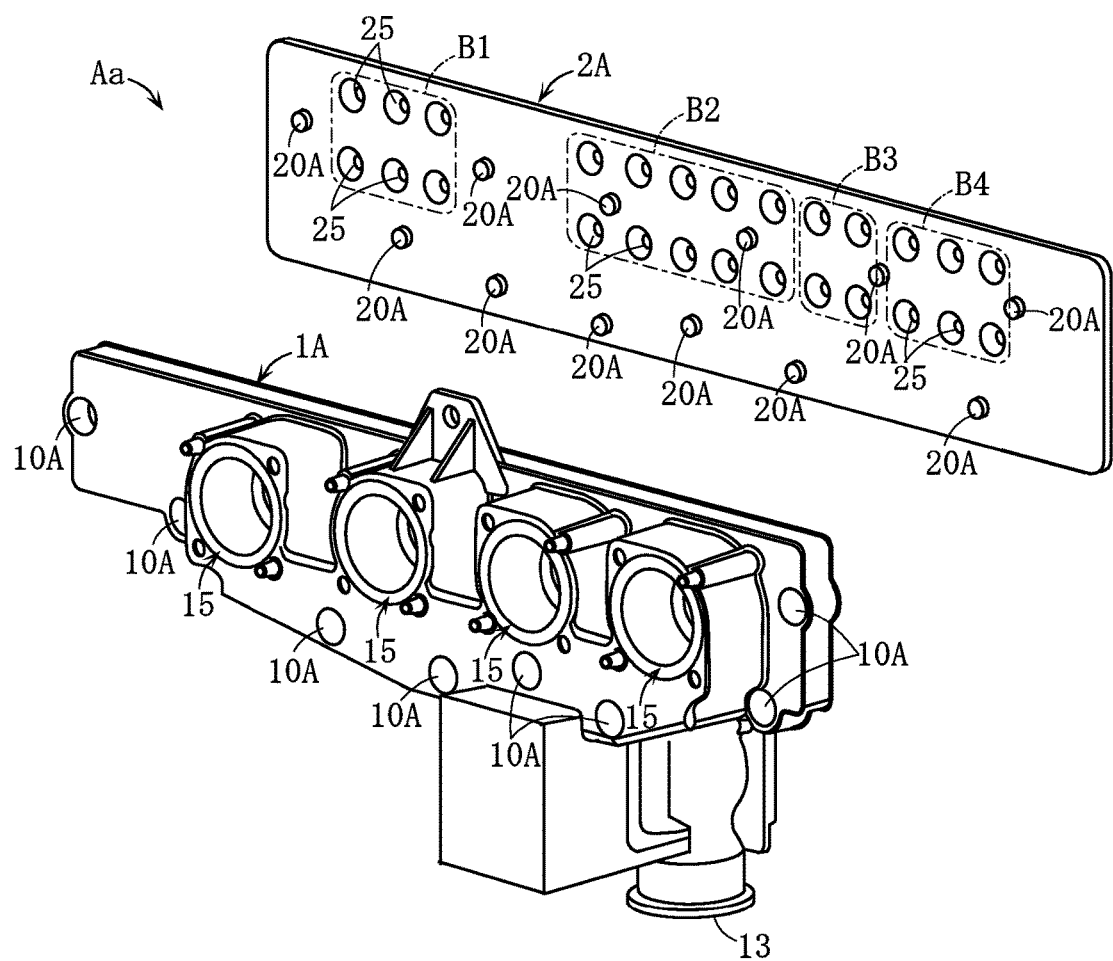
FIG. 12 is an exploded perspective view showing an essential part in FIG. 10.

A gas supply manifold Aa shown in FIG. 10 to FIG. 12 has a nozzle forming member 2A, a press-molded product made of aluminum or other metals, and a cover member 1A, a die-cast product such as an aluminum die-cast product.

Each part of the cover member 1A is remarkably thick comparing to that of the nozzle forming member 2A. The cover member 1A has a gas flow inlet 13 for receiving supply of fuel gas from a gas pipe, not shown, a gas supply path 29a communicating with the gas flow inlet 13, a plurality of valve attachment portions 15, and so on. The cover member 1A and the nozzle forming member 2A are overlapped via the sealing packing 3 and are fastened via a caulking-fastening portion Ca to be mentioned below. Thus, as shown in FIG. 11, a gas supply path 29 capable of communicating fuel gas from the gas supply path 29a in the cover member 1A to a gas injection nozzle 25 is provided between the cover member 1A and the nozzle forming member 2A.

A valve V shown in FIG. 11 is an electromagnetic on-off valve having a valve body 80 capable of opening or closing an opening portion 14b which constitutes a boundary between the gas supply paths 29, 29a. A plurality of gas injection nozzles 25 are divided into, for example, four blocks B1 to B4 shown with imaginary lines in FIG. 12, a plurality of valves V are provided for controlling supply or stop of fuel gas to the blocks B1 to B4. The cover member 1A has valves, i.e. a flow control valve, a main electromagnetic valve, and the like, other than the above-mentioned valves; however, such valves are not explained here.

The caulking-fastening portion Ca is used for fastening the cover member 1A and the nozzle forming member 2A. As clearly shown in FIG. 13, a part of an inner circumferential face, close to the nozzle forming member 2A, of a through hole 10A which penetrates in the thickness direction of the cover member 1A forms an inclined inner circumferential face 10a of which inner diameter reduces toward the nozzle forming member 2A. On the other hand, the nozzle forming member 2A has a convex portion 20A to be inserted into the through hole 10A and has an engagement portion 22A shaped in such a manner that the convex portion 20A abuts the inclined inner circumferential face 10a. Specifically, a dent portion 21A is formed by pressing a substantially central portion of a tip end face of the convex portion 20A. Preferably, the dent portion 21A is shaped so as to reduce the inner diameter or the width toward the nozzle forming member 2A. The outer circumferential face around the outer area, i.e. the engagement portion 22A, of the dent portion 21A is an inclined outer circumferential face 20e which faces and contacts the inclined inner circumferential face 10a.

As shown in FIG. 12, the through hole 10A and the convex portion 20A, i.e. the convex portion 20A before caulking in FIG. 12, are provided at plural areas of the cover member 1A and the nozzle forming member 2A in such a manner that the overlapped portions of the cover member 1A and the nozzle forming member 2A do not have an inappropriate gap causing leakage of gas.

Figure 14A:
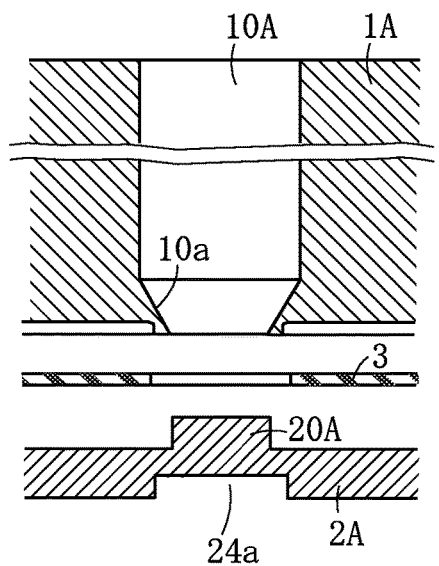
FIG. 14A and FIG. 14B are enlarged views of an essential part showing a method for obtaining the structure in FIG. 13.
Figure 14B:
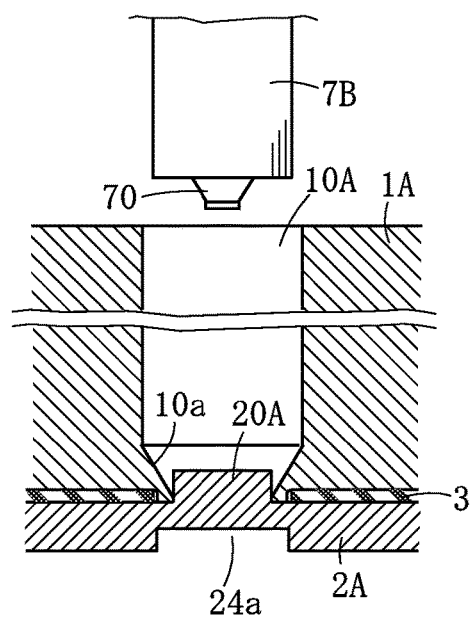

The above-mentioned caulking-fastening portion Ca is obtained as shown in FIG. 14A and FIG. 14B.

Figure 13:
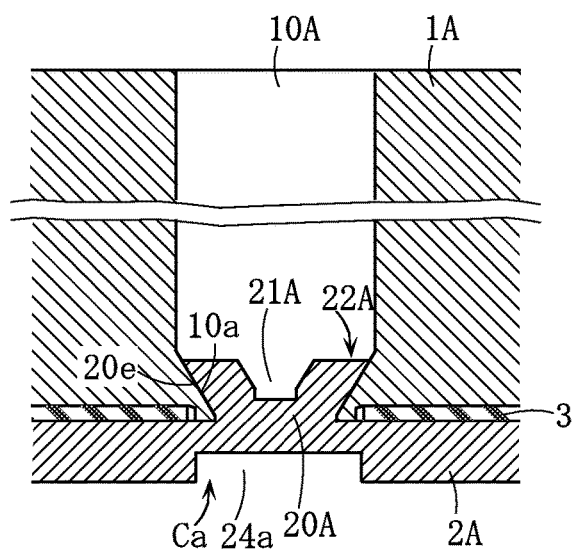
FIG. 13 is an enlarged view of a part XIII in FIG. 11.

As shown in FIG. 14A, the cover member 1A is formed with the through hole 10A having the inclined inner circumferential face 10a. On the other hand, the nozzle forming member 2A is provided with the convex portion 20A formed by a pressing process for extruding a part of the nozzle forming member 2A so as to form a concave portion 24a on one face. The width of the concave portion 24a is the same as or greater than that of the convex portion 20A. As shown in FIG. 14B, the cover member 1A and the nozzle forming member 2A are overlapped so as to interpose the sealing packing 3 and the convex portion 20A is inserted into the through hole 10A. Then, a punch 7B is inserted into the through hole 10A from one opening end portion and presses the convex portion 20A to be plastically deformed. In such a case, the concave portion 24a is supported by an appropriate member so as to keep the position in such a manner that the nozzle forming member 2 does not undesirably deflect downward. A projecting portion 70 is provided at a tip end portion of the punch 7B so as to form the dent portion 21A shown in FIG. 13. The projecting portion 70 intensively presses the central portion of the tip end face of the convex portion 20A toward the base portion side of the convex portion 20A. Thereby, the deformation amount of the convex portion 20A outward in the radius direction of the through hole 10A increases and the engagement portion 22A shown in FIG. 13 is appropriately formed.

In the gas supply manifold Aa as mentioned above, the entire thickness of the cover member 1A is relatively large, but the cover member 1A and the nozzle forming member 2A are appropriately caulked and fastened. The inclined outer circumferential face 20e of the convex portion 20A on the side of the nozzle forming member 2A contacts under pressure in a wide area relative to the inclined inner circumferential face 10a on the side of the cover member 1A, thereby enhancing the caulking-fastening strength and preventing gas leakage. As a result, a screw member like a screw is not required for fastening the cover member 1A and the nozzle forming member 2A or such requirement is reduced, thereby achieving a low production cost of the gas supply manifold Aa.

The present invention is not limited to the above-mentioned preferred embodiments. The concrete configuration of the members of the gas supply manifold of the present invention is freely designed within the intended scope of the present invention. In addition, the concrete procedure of the production method of the gas supply manifold of the present invention is freely designed within the intended scope of the present invention.

In the above-mentioned embodiments, the convex portion is provided for the nozzle forming member and the hole for inserting the convex portion is provided for the cover member. Conversely, the nozzle forming member can be provided with the hole and the cover member can be provided with the convex portion. The gas supply manifold of the present invention is not limited to be used for a gas combustion apparatus of a water heating apparatus and the practical use is not limited.

The invention claimed is:

1. A gas supply manifold, comprising:
   a nozzle forming member having a plurality of gas injection nozzles;
   a cover member configured to be overlapped on the nozzle forming member and to form a gas supply path communicating with the gas injection nozzles between the cover member and the nozzle forming member; and
   at least one caulking-fastening portion configured to fasten the nozzle forming member and the cover member;
   wherein the caulking-fastening portion is configured in such a manner that a convex portion provided for one of the nozzle forming member and the cover member penetrates through a hole provided for the other member, and a tip end portion of the convex portion projects out of the hole and is formed with an engagement portion, the engagement portion having a larger diameter or a larger width than the hole and engaging with a peripheral edge portion of the hole,
   a tip end face of the convex portion has a dent portion formed by pressing the tip end face toward a base portion side of the convex portion and an area around the dent portion of the convex portion constitutes the engagement portion,
   one member, having the hole, of the nozzle forming member and the cover member is formed in such a manner that a first area around the hole is partially thinner than a second area other than the first area,
   a step is provided between the first area and the second area in such a manner that the first area contacts the other member of the nozzle forming member and the cover member, and the second area is separated from the other member, and
   a sealing packing is provided between the second area and the other member of the nozzle forming member and the cover member, and the sealing packing is provided apart from an area of direct contact between the first area and the other member.

2. The gas supply manifold as set forth in claim 1, wherein the dent portion has a bottom portion and an inclined inner circumferential face of which inner diameter increases toward a tip end side of the convex portion from the bottom portion.

3. The gas supply manifold as set forth in claim 2, wherein the inclined inner circumferential face is a convexly curved face of which inclination angle gradually becomes perpendicular to an axial direction of the convex portion toward the tip end side of the convex portion.

4. The gas supply manifold as set forth in claim 3, wherein an area, corresponding to the engagement portion, of the tip end face of the convex portion has a flat face portion having an angle substantially perpendicular to the axial direction of the convex portion.

* * * * *